United States Patent [19]

Lee et al.

[11] Patent Number: 5,925,587
[45] Date of Patent: Jul. 20, 1999

[54] SUPPORTED POLYMERIZATION CATALYST COMPONENT AND SYSTEM, POLYMERIZATION PROCESS USING SAME FOR THE PRODUCTION OF ULTRA-FINE PARTICLE SIZE RESINS WITH IMPROVED CRYSTALLIZATION RATES

[75] Inventors: Chun D. Lee, Cincinnati, Ohio; Richard W. Fries, Joliet, Ill.

[73] Assignee: Equistar Chemicals, LP, Houston, Tex.

[21] Appl. No.: 08/967,578

[22] Filed: Nov. 10, 1997

Related U.S. Application Data

[63] Continuation of application No. 08/519,034, Aug. 24, 1995, abandoned.

[51] Int. Cl.$^6$ ........................................... C08F 4/02
[52] U.S. Cl. ................ 502/117; 502/103; 502/119; 502/120; 502/125; 502/152; 526/124.5; 526/124.6; 526/124.7; 526/124.8; 526/352; 526/943; 526/160; 526/351
[58] Field of Search ...................... 502/103, 117, 502/119, 120, 125, 152; 526/124.5, 124.6, 124.7, 124.8, 943, 352, 160

[56] References Cited

U.S. PATENT DOCUMENTS

| | | |
|---|---|---|
| 3,950,303 | 4/1976 | Lipscomb . |
| 4,104,243 | 8/1978 | Howard, Jr. . |
| 4,473,672 | 9/1984 | Bottrill . |
| 4,548,916 | 10/1985 | Baker . |
| 4,564,647 | 1/1986 | Hayashi et al. . |
| 4,605,714 | 8/1986 | Baker . |
| 4,910,272 | 3/1990 | Marchand et al. ....................... 526/129 |
| 4,923,937 | 5/1990 | Seppänen et al. .................... 526/124.6 |
| 5,231,151 | 7/1993 | Spencer et al. .......................... 526/116 |
| 5,422,386 | 6/1995 | Fries et al. ............................... 523/344 |

FOREIGN PATENT DOCUMENTS 63-256603  10/1988  Japan .

OTHER PUBLICATIONS

H. Sinn et al. Adv. Organomet. Chem. 18, 99, 140–141 148–149 (1980).

Hawley's Condensed Chemical Dictionary, 11th Ed. Van Nostrand Reinhold, New York, 1987, p. 1117.

*Primary Examiner*—David W. Wu
*Attorney, Agent, or Firm*—Scully, Scott, Murphy & Presser

[57] ABSTRACT

A supported polymerization catalyst component and a catalyst system useful in the production of polyolefin resins that have a narrow particle size distribution and enhanced crystallization rates is provided. The supported polymerization component comprises talc, an organomagnesium compound or complex, wherein the weight ratio of talc to magnesium in the organomagnesium compound or complex is from about 1000:1 to about 5:1, at least one transition metal containing compound and/or a metallocene effective in alpha-olefin polymerization reactions, and, optionally, an alcohol or a silane. The catalyst system of the instant invention includes the aforementioned alpha-olefin polymerization catalyst component and at least one aluminum-containing cocatalyst compound. A process for polymerizing or copolymerizing alpha-olefins, conducted under olefin polymerization conditions utilizing the inventive catalyst system of this invention is also described.

22 Claims, No Drawings

SUPPORTED POLYMERIZATION CATALYST COMPONENT AND SYSTEM, POLYMERIZATION PROCESS USING SAME FOR THE PRODUCTION OF ULTRA-FINE PARTICLE SIZE RESINS WITH IMPROVED CRYSTALLIZATION RATES

This application is a continuation, of application Ser. No. 08/519,034 filed Aug. 24, 1995, now abandoned.

FIELD OF THE INVENTION

This instant invention relates to a supported polymerization catalyst component which is useful in the production of polymer resins that have an ultra-fine particle size and that exhibit improved crystallization rates. More specifically, the present invention relates to a supported polymerization catalyst component that is useful in the polymerization or copolymerization of alpha-olefins.

The supported polymerization catalyst component of the present invention, when used in conjunction with a suitable cocatalyst component in the polymerization of one or more alpha-olefins, results in the production of an ultra-fine polyolefin resin that has a narrow particle size distribution and exhibits improved crystallization rates than heretofore known. Moreover, the polyolefin resins produced using the supported catalyst component of the instant invention contain a uniform dispersion of talc therein and the resins exhibit high clarity and less warping than polyolefin resins produced using conventional silica supported polymerization catalysts or systems wherein talc is added as an additive to the polyolefin. The foregoing physical properties makes the polyolefin resins produced in the instant invention suitable for use in a wide variety of applications, such as in rotational molding.

BACKGROUND OF THE INVENTION

The use of organic polymers in numerous applications has grown in recent years to the degree that rigid polymers such as nylons and polyacetal resins have almost replaced more conventional metal, wood, and ceramic materials. The development of low cost and efficient methods of preparing polyolefin resins has made them excellent candidates for a wider range of applications provided that certain physical properties such as clarity, hardness, warping and crystallization rates can be improved.

In recent years, much research has been conducted in the field to develop various methods and/or catalysts for improving the physical properties of polyolefin polymers. A vast majority of this research has been directed towards filling polyolefins with finely divided solids or fibrous fillers. One such method of providing filled polyolefins is by melt mixing the polyolefin with a filler material such as talc. This procedure, however, requires that the polyolefin be of relatively low molecular weight, that is, have an inherent viscosity less than about 2. While the resulting polymeric products produced by this method may generally have some improved physical properties, they do suffer from the disadvantage of having a slow crystallization rate.

Furthermore, serious problems of compounding these polymers, prepared by melt mixing with talc, are encountered as manifested by high power required in operating mixing machinery, heat degradation of polymer, nonuniformity of talc dispersion and poor adhesion of the polymer to talc, even when coupling agents are employed.

Recently, various methods have been proposed and developed to decrease the problems mentioned above, the most widely of which is the polymerization of the olefin in the presence of selected fillers such as talc. One suggested method of effecting olefin polymerization in the presence of the filler is by employing a coordination catalyst. In this method, well-known coordination catalysts comprising the combination of a transition metal halide, an ester and a reducing compound, such as an organometallic compound of a metal of Group Ia, IIa or IIIa of the Periodic Table of Elements, are generally employed.

Another method of improving the physical properties of polyolefins using a filler material such as talc is disclosed in U.S. Pat. No. 3,950,303 to Lipscomb. This reference describes a process of polymerizing olefins onto a chromium-modified filler in the presence of an organometallic compound. Moreover, the process disclosed by Lipscomb involves (a) contacting an inorganic filler material with a solution of a chromium(III) compound whereby the chromium compound is adsorbed onto the surface of the filler; (b) activating the chromium-modified filler by drying; (c) dispersing the filler as a slurry in an inert, liquid hydrocarbon; (d) adding an organoaluminum compound to said slurry; and (e) polymerizing an olefin in said slurry. This method is said to result in the formation of an essentially homogeneous, filled polyolefin composition having a good combination of hardness, toughness and stiffness.

U.S. Pat. No. 4,104,243 to Howard, Jr. relates to a process for preparing low viscosity inorganic filler compound dispersions and the use of the same in the preparation of polyolefin/inorganic filler compositions. More specifically, the process as described in the reference involves dispersing a large amount of a finely divided inorganic filler compound as a slurry in an inert hydrocarbon diluent in the presence of an organoaluminum compound. This slurry is then contacted with a Ziegler-type catalyst and an olefin to produce a polyolefin/filler composition.

U.S. Pat. No. 4,473,672 to Bottrill relates to a process of producing a polymer composition which is a composite material containing an olefin polymer and a filler. Moreover, the patentee discloses a polymer composite which is produced by polymerizing an olefin monomer in the presence of a catalyst system obtained by reacting a filler material with (a) an organic magnesium compound which contains a halogen or (b) an organomagnesium compound and thereafter with a halogen-containing compound; and then treating that reaction product with a transition metal compound, which is preferably $TiCl_4$, and an organic activating compound. The resultant homogeneous composites are said to have good flow characteristics.

The method disclosed by Bottrill, however, suffers from the disadvantage that the composite will contain a halogen, therefore, it is necessary to carry out a deashing step. The use of a deashing step is undesirable since those skilled in the art are aware that halogens can adversely affect the polymer product as well as cause corrosion of the machinery used to process the final product.

One such method of overcoming the deashing problem described above is disclosed in U.S. Pat. No. 4,564,647 to Hayashi et al. which describes a process for producing a polyethylene composition which comprises polymerizing ethylene in the presence of a catalyst comprising a contact treatment product of a high activity catalyst component, a filler and an organoaluminum compound. This process does not require a deashing step since the catalyst employed has remarkably high activity although containing very little halogen.

Japanese Patent No. 63-256603 provides a highly crystalline polypropylene resin which is prepared by polymerizing propylene in the presence of a catalyst system comprising a solid transition metal catalyst that is prepared by supporting a titanium halide on a carrier comprising talc and a magnesium halide wherein the weight of talc to magnesium halide is in the range of between 1:1000 and 1:1. This correlates to a range of talc to magnesium in the magnesium halide of between 1:3915 to 1:3.9.

Despite the current state of the art, there still exists a need to develop new solid catalyst components which, when used in conjunction with suitable cocatalysts, provide polyolefin resins that have improved physical properties as well as having a uniform dispersion of a filler, such as talc, dispersed in the resin.

SUMMARY OF THE INVENTION

The present invention is directed to a supported alpha-olefin polymerization catalyst component and to a catalyst system which is useful in the in-situ polymerization of one or more alpha-olefins. More specifically, the supported polymerization catalyst component of the instant invention comprising talc, an organomagnesium compound or complex, wherein the weight ratio of talc to magnesium in the organomagnesium compound is in the range from about 1000:1 to about 5:1, preferably from about 500:1, and at least one transition metal compound and/or metallocene containing a metal from Group IVB or VB of the Periodic Table of Elements. An alcohol or a silane as defined hereinbelow may be optionally present in the supported polymerization component of the instant invention.

The catalyst system of the present invention comprises the aforementioned supported polymerization catalyst component and one or more aluminum-containing cocatalyst compounds. The aluminum-containing cocatalyst compounds are conventional aluminum cocatalysts well known in the art, e.g., aluminum alkyls or aluminoxanes. It should be noted that aluminoxanes are particularly preferred when the solid catalyst component contains a metallocene.

In another aspect of the present invention, a process for polymerizing or copolymerizing alpha-olefins is disclosed. In this process, at least one alpha-olefin is polymerized under olefin polymerization conditions utilizing the catalyst system of the present invention, which includes the talc supported polymerization catalyst component and one or more aluminum-containing cocatalysts.

As stated hereinabove, the catalyst of the present invention represents an advancement in the art given that the crystallization rates of the polyolefins produced are higher than polyolefin resins prepared from conventional silica supported catalysts or in systems wherein talc is used as a post reactor additive. The enhanced crystallization rates obtained in the instant invention improve the ability of the polyolefin resins to nucleate. Thus, the catalyst of the present invention produces a polyolefin resin that has a high degree of clarity, a more balanced stiffness/impact property, less warping, and complete and uniform dispersion of talc therein than heretofore known. Moreover, the catalyst of the instant invention produces polyolefin resins that have a narrow particle size distribution comparable to the ultra-fine particle size of the talc. That is, the particle size distribution of the polyolefin resin produced in the instant invention can be controlled by the particle size of the talc used in preparing the supported polymerization catalyst component of the instant invention. Such polyolefin resins having an ultra-fine particle size are especially useful in specialty applications such as rotational molding or applications requiring fine powder form.

DETAILED DESCRIPTION OF THE INVENTION

The talc supported catalyst component utilized in the present catalyst system is prepared by initially contacting talc with at least one organomagnesium compound or complex and, as appropriate, an alcohol or a catalyst modifying compound. It is noted that the term "talc" is used herein to define a magnesium silicate support having the formula $Mg_3Si_4O_{10}(OH)_2$.

The talc utilized in the preparation of the solid catalyst component is preferably a high surface area high pore volume material defined by a specific surface area of between about 0.4 $m^2/g$ and about 15 $m^2/gm$; a median particle size of about 0.4 microns to about 7 microns and a pore volume of about 0.001 cc/gm to about 0.1 cc/gm as determined by standard Brunauer, Emmett and Teller (BET) measurements.

In a preferred embodiment of the invention the talc is pretreated prior to its use to remove any impurities and/or reduce the number of surface hydroxyl groups, which groups may inhibit the activity of the resultant catalyst component.

To effectuate adequate reduction of hydroxyl groups from the surface of talc, the talc may be heated in an inert atmosphere at a temperature of at least about 150° C. Preferably, pretreatment of the talc is performed in the temperature range from about 150° C. to about 650° C. in an inert gas atmosphere, i.e. nitrogen or argon.

The pretreated talc is then reacted with an organomagnesium compound or complex which is soluble in organic solvents. The organomagnesium compounds useful in the present invention are the alkyls, alkoxides or aryls of magnesium or its complexes such as complexes with alkyl aluminum compounds. Mixtures of the organomagnesium compounds or complexes are also contemplated herein.

The structure formulas of some of the preferred organomagnesium compounds that may be employed in the instant invention are $RMgX$, $R_2^1Mg$ and $(R_2Mg)nAlR_3$ where R and $R^1$ are each independently an alkyl or alkoxide containing from about 1 to about 12 carbon atoms or aryls such as phenyl, naphthyl, and cyclopentadienyl; n is 0.5–10, and X is a halide such as chloride or bromide. As stated above, complexes of the foregoing organomagnesium compounds with organoaluminum halides can also be used in the instant invention. The complexes may contain small amounts of aluminum or magnesium alkoxides.

The magnesium-aluminum complexes that may be employed in the instant invention are well known in the art, i.e. Aishima et al., U.S. Pat. No. 4,004,071 at Column 2, lines 34–40 and at Column 3, lines 30–36. The complexes are prepared according to the teachings of Ziegler et al., Organometallic Compounds XXII: organomagnesium-Aluminum Complex Compounds, *Annalen der Chemie*, 605, pp. 93–97 (1957). A preferred magnesium complex that may be employed in the instant invention is MAGALA which is supplied by Akzo Chemical.

The amount of organomagnesium compound or complex used in the present invention to make the solid catalyst component comprises between about 0.1% to about 20%, said percentages being by weight, based on the total weight of talc and the weight of magnesium from the organomagnesium compound. More preferably, this weight ratio is in the range of about 0.15% to about 0.4%. It should be noted that the weight ratio of talc to magnesium in the organomagnesium compound is in the range from about 1000:1 to about 5:1. More preferably, the weight ration of talc to magnesium in the organomagnesium compound is about 500:1. This weight ratio of talc to magnesium employed in the instant invention is considerably higher than heretofore employed in the prior art.

The reaction mixture containing the organomagnesium compound or complex and talc may then be optionally treated, with an alcohol or a silane. Specifically, an alcohol is employed in cases wherein a polyethylene polymer is desirable. Suitable alcohols employed in the instant invention include aliphatic or aromatic alcohols containing from about 1 to about 12 carbon atoms. In a preferred embodiment of the present invention, the alcohol is an aliphatic alcohol containing from about 1 to about 5 carbon atoms. Of these preferred alcohols, n-butyl alcohol is particularly preferred.

The amount of alcohol that optionally may be added to the reaction mixture is from about 0.01 to about 1.0 mmol per gram of talc. More preferably, the concentration range of alcohol is from about 0.01 to about 0.35 mmol per gram of talc.

The silane, that may be optionally employed in the present invention, has the formula $SiH_rX_s^2$ wherein $X^2$ is a halogen; r is 0, 1, 2 or 3; and s is 1–4, with the proviso that the sum of r and s is 4. The silane is employed when a polypropylene polymer is desirable. Suitable silanes having the above formula include, but are not limited to, silicon tetrachloride, trichlorosilane, tribromosilane, dichlorosilane, dibromosilane and mixtures thereof. Of these silanes, trichlorosilane is particularly preferred.

When present, the concentration of the silane is from about 0.01 to about 1.0 mmol per gram of talc. More preferably, the concentration of the silane to talc is from about 0.01 to about 0.35 mmol per gram talc.

The contacting step between the talc, the soluble organomagnesium compound or complex and, optionally, the alcohol or silane usually occurs at a temperature in the range of about 15° C. to about 120° C. More preferably, this contact occurs at a temperature in the range of about 50° C. to about 110° C. The contact occurs over a period of about 30 minutes to about 4 hours. Preferably, the contact occurs over a period of between about 1 hour to about 3½ hours. Still more preferably, this contact occurs over a period of between about 1½ hours to about 2½ hours.

The organic solvent employed to solubilize the organomagnesium compound or complex can be any aliphatic or aromatic hydrocarbon solvent containing from about 5 to about 15 carbon atoms. In a preferred embodiment, aliphatic hydrocarbon solvents such as pentane, heptane, hexane, cyclohexane and the like are used to solubilize the organomagnesium compound or complex. Of these organic solvents, heptane is most preferred.

The organic solvent should be purified prior to use. This can be accomplished by percolation through silica gel and/or molecular sieves to remove trace quantities of water, oxygen, polar compounds and other materials capable of adversely affecting the catalyst activity.

Furthermore, all of the contacting steps described herein are carried out in an inert atmosphere, such as under a blanket of nitrogen or argon, in order to prevent air or moisture from coming into direct contact with the solid catalyst component.

In yet another preferred embodiment, the reaction product of the magnesium component or complex, talc, and optionally, the alcohol or silane may then be dried under precisely defined conditions until most of the heptane solvent is removed. The drying process that may be utilized in the present invention has been previously described in U.S. Pat. Nos. 5,221,650 and 5,275,991, the contents of which are incorporated herein by reference. This drying process is effective in providing effective wetting of the surface area of said compound or complex such that a regular, essentially continuous distribution of accessible magnesium values is present on the talc for further reaction. The process provides a statistically averaged surface coverage of magnesium values of about 1 to about 3 layers.

Typically, drying is conducted under an atmosphere of, and with a slow purge, e.g. 10 ml/min., nitrogen. In small volumes the granular coated support may be dried in a paddle stirred container with heat supplied from an external source. It should be noted that no drying step need be conducted at this stage of the preparation of the solid catalyst component. Instead, the reaction mixture containing the talc, organomagnesium compound or complex, and, optionally, the alcohol or silane may be directly contacted with the transition metal compound and/or metallocene.

The solid product or mixture containing the organomagnesium compound or complex, talc and optionally, the alcohol or the silane is then reacted with at least one or more transition metal compounds and/or metallocenes belonging to Groups IVB and/or VB of the Periodic Table of Elements which are known to be effective in the polymerization of alpha-olefins. Such transition metal compounds and metallocenes are well known to those skilled in the art.

Suitable Group IVB transition metal compounds that may be employed in the instant invention have the structural formula $M(OR^2)_qX_p^3$, wherein M is titanium, zirconium or hafnium, $R^2$ is aryl, alkyl, aralkyl, cycloalkyl or alkylsilyl; $X^3$ is halogen; p is an integer from 1 to 4; and q is 0 or an integer from 1 to 3; with the proviso that the sum of p and q is 4. It is especially preferred that M be titanium.

In the preferred embodiment wherein M is titanium, the titanium-containing compound is characterized by "p" being an integer from 2 to 4 and q being 0 or an integer of 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still more preferably wherein M is titanium, the titanium-containing compound is defined by "p" being 4, "q" being 0, and $X^3$ being chlorine or bromine. Thus, the titanium compound is most preferably titanium tetrachloride or titanium tetrabromide. Of these two titanium compounds, titanium tetrachloride is most preferred.

Suitable Group VB transition metal compounds within the scope of the catalyst component are compounds that have the structural formula $M'(OR^3)_x(O)_y(X^4)_z$, wherein M' is a metal of Group VB; $R^3$ is a hydrocarbyl having from about 1 to about 18 carbon atoms; $X^4$ is halogen; x is 0 or an integer from 1 to 5; and y is 0 or 1; and z=(5−x−2y) or 4 or 3 when x and y are 0, respectively. It is especially preferred that M' be vanadium.

Suitable vanadium compounds encompassed by the above formula include vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride and the like.

In addition to the forgoing transition metal compounds, metallocenes represented by the following general formulas are also contemplated herein:

$$(Cp)_aM''R_b^4X_c^5 \qquad (I)$$

wherein Cp is a cyclopentadienyl, an indenyl or a fluorenyl ring; M" is a Group IVB or VB transition metal; R⁴ is a hydride or a hydrocarbyl group having from about 1 to about 20 carbon atoms; X⁵ is a halogen atom; a is an integer of 1 to 3; b is 0 or an integer of 1 to 3; c is 0 or an integer of 1 to 3; with the proviso that the sum of a+b+c is equal to the oxidation state of M".

  (II)

  (III)

wherein $(C_5R_k^5)$ is substituted or unsubstituted cyclopentadienyl, indenyl or fluorenyl; each R⁵ is the same or different and is hydrogen or a hydrocarbyl radical such as alkyl, alkenyl, aryl, alkaryl or aralkyl radical containing from about 1 to about 20 carbon atoms or are two carbon atoms joined together to form a $C_4$–$C_6$ ring; R⁶ is a $C_1$–$C_4$ alkylene radical, dialkyl germanium, dialkylsilicon, an alkyl phosphine or an amine radical bridging two $(C_5R_k^5)$ rings; Q is a hydrocarbyl radical such as aryl, alkyl, alkenyl, alkaryl, or aralkyl having from about 1–20 carbon atoms, a hydrocarboxy radical having from about 1–20 carbon atoms or halogen and can be the same or different from each other; Q' is an alkylidiene radical having from 1 to about 20 carbon atoms; f is 0 or 1; g is 0, 1 or 2; with the proviso that f is 0 when g is 0, k is 4 when f is 1, and k is 5 when f is 0, and M" is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy, ethoxy, butoxy, amyloxy and the like.

Exemplary of the alkylidiene radicals is methylidene, ethylidene and propylidene.

It should be noted that mixtures of the above-identified transition metal compounds and/or metallocenes are also contemplated in the instant invention. Thus, it is possible to have a mixed catalyst component which contains a transition metal compound such as $TiCl_4$ and a metallocene such as $(Cp)_2ZrCl_2$.

This contact between the transition metal-containing compounds and/or the metallocene and the organomagnesium-containing solid product or mixture occurs at a temperature of from about 0° C. to about 100° C. More preferably, the temperature of this contacting step is from about 20° C. to about 100° C. Most preferably, the temperature is from about 25° C. to about 50° C.

The time employed for contacting the organomagnesium-containing solid product or mixture with the transition metal-containing compound and/or metallocene is from about 0.25 to about 4 hrs. Most preferably, the time of this contacting step is from about 0.25 to about 1 hr.

The concentration range of transition metal-containing compound and/or metallocene employed in the present invention is from about 0.01 to about 10 mmol of transition metal compound and/or metallocene per gram of talc. More preferably, the concentration of transition metal compound and/or metallocene used in this contacting step is from about 0.05 to about 1.0 mmol of transition metal compound and/or metallocene per gram talc.

The above reaction mixture containing talc, organomagnesium compound or complex, and transition metal compound and/or metallocene is then dried as described hereinabove.

It should be appreciated that all the treatment steps in the formation of the catalyst component of this invention, the contact of talc with the organomagnesium compound or complex, optionally alcohol or silane, and transition metal compound and/or metallocene involve contact between a solid, talc, and a liquid. This is because each of the compounds that are contacted with talc are liquids or are soluble in an inert hydrocarbon solvent under the conditions employed in the present invention. As such, no ball-milling or other solid mixing is required. Ball milling is an expensive and difficult operation, often employed in the formation of polymerization catalysts of the prior art. Those skilled in the art are aware, in the case where a hydrocarbon solvent is employed, that the solvent may be allowed to remain with the reaction mass or can be removed by decantation, filtration, evaporation, or the like.

The talc supported catalyst component produced herein is then contacted under polymerization reaction conditions with at least one cocatalyst component. In a preferred embodiment, the talc supported catalyst component is contacted under polymerization conditions with an aluminum-containing cocatalyst.

The aluminum-containing cocatalyst component is preferably an alkylaluminum-containing compound. Alkylaluminum-containing compounds suitable for use in the present invention include trialkylaluminums, alkylaluminum halides, alkylaluminum hydrides, aluminoxanes (either cyclic or linear) or mixtures thereof. When the catalyst component of the instant invention contains a metallocene as one of its components, the preferred cocatalyst component is an aluminoxane. Of the aluminoxanes known to those skilled in the art, methylaluminoxane is particularly preferred.

The molar ratio of aluminum-containing cocatalyst to talc supported catalyst component is in the range of between about 1 to about 2000. More preferably, the molar ratio of cocatalyst to talc supported catalyst component is from about 5 to about 500. These ratios are based upon the number of grams of transition metal present in the solid catalyst component.

In still another aspect of the present invention a process for polymerizing or copolymerizing at least one alpha-olefin is set forth. This process comprises polymerizing at least one alpha-olefin under olefin polymerization conditions in the presence of the catalyst system of the present invention. That is, in the presence of the talc supported catalyst component and the cocatalyst component of the instant invention.

Alpha-olefins suitable in this process include α-olefins containing from about two to about twelve carbon atoms such as ethylene, propylene, butene, pentene, and the like. Mixtures of these alpha-olefins are also contemplated herein. In a particularly preferred embodiment of the present invention, the alpha-olefin polymerized is ethylene.

In this preferred embodiment wherein ethylene is polymerized, polymerization of ethylene occurs at a temperature in the range of between about 40° C. and about 250° C. More preferably, the temperature of this reaction is in the range of about 50° C. and about 150° C. The pressure of the ethylene polymerization reaction is in the range of between about 50 psig and about 1000 psig, more preferably, between about 100 psig and about 700 psig. In a preferred embodiment ethylene polymerization occurs in the presence of hydrogen gas.

As stated above, the polyolefin resins produced in the present invention contain a uniform dispersion of talc therein. Moreover, the polyolefins produced in the instant invention have a narrow particle size distribution which can be controlled by changing the particle size of the talc used in the instant invention. In addition to the foregoing properties, the polyolefins resins produced in the instant invention exhibit a faster crystallization rate than polyolefins produced by either conventional silica supported polymerization catalyst or in systems wherein talc is added to the polyolefin resins as a post reactor additive. Moreover, due to the high crystallization rate exhibited by the polymers of the instant invention, the products produced therefrom have a high degree of clarity, a more balanced stiffness/impact property, and they exhibit less warping than heretofore known.

The following examples are given to illustrate the scope of this invention. Because these examples are given for illustrative purposes only, the invention embodied therein should not be limited thereto.

EXAMPLES 1–7

Preparation of Solid Catalyst Component

Various talc supports having different particle sizes, as indicated in Table 1, were dried at 150° C. under a nitrogen flow for about 1.5 hours. A three-necked, round bottom flask was equipped with a nitrogen inlet, outlet, septum for injecting ingredients and a magnetic stirring bar. In a dry box, 24.0 g of the desired support material was weighed into the flask and the septum was inserted therein. Next, 100 ml of dry heptane was added and the slurry was mixed at room temperature for about 5 minutes. After this period of time, 3.8 ml of MAGALA 7.5 E in heptane from Akzo Chemical was injected into the flask and the contents of the flask were stirred at room temperature for about 30 minutes.

After 30 minutes of stirring, 0.20 ml of n-butanol was injected into the flask and the contents were stirred for an additional 30 minutes. Thereafter, 0.28 ml of titanium tetrachloride was injected into the flask and the slurry was stirred for 30 minutes. Next, the nitrogen purge was increased and the flask and its contents were heated to about 50° C.–60° C. This drying process continued until the catalyst was completely dried.

Polymerization of Ethylene

A 1-liter autoclave was charged with 1.0 ml of MMAO type 3A methyl aluminoxane from Akzo Chemical or 1.0 ml of 25% triisobutyl aluminum in heptane from Akzo Chemical, 0.18 g of one of the previously prepared catalysts, 10 ml of heptane and 15 ml of 1-hexene for the copolymers. The hexene was omitted in Examples 1 to 3, in the formation of HDPE. Hydrogen was then added to the reactor by a pressure drop of 20 psig from a 150 ml vessel. Next, 500 ml of isobutane was added to the reactor and the temperature was rapidly raised to 50° C. Ethylene (300 psig) was added to the reactor and fed on demand as the reactor was raised to 80° C. Ethylene uptake was stopped after the desired amount of the polymer was formed by monitoring the monomer mass flow meter. The contents of the flask were then vented and the polymer was isolated.

The polymerization results for these catalysts are shown in Table 1. Also shown in Table 1 is the median particle size of the polymers produced using the various talc supported catalysts as well as the number of polymer particles that are less than 90%. This data illustrates that the median particle size of the polymer can be controlled by varying the particle size of the talc support.

COMPARATIVE EXAMPLE 1

A silica supported catalyst was prepared and ethylene was polymerized using the catalyst preparation procedure and polymerization procedure set forth in Examples 1–7 except that 2.0 g of Davison [trademark] 948 silica was employed as the support material and was previously treated with hexamethyldisilazane as described in U.S. Pat. No. 4,374,745. Then, 1.9 ml of MAGALA was introduced into the flask and the contents were stirred for 30 minutes. After the 30 minutes of stirring, 0.1 ml of n-butanol was injected into the flask and the contents were stirred for an additional 30 minutes. Thereafter, 0.14 ml of titanium tetrachloride was injected into the flask and the slurry was stirred for 30 minutes. Next, the nitrogen purge was increased and the flask and its contents were heated to about 50°–60° C. This drying process continued until the catalyst was completely dried.

The polymerization data as well as the median particle size of the polymer produced are summarized in Table 1. These results show that the medium particle size distribution for talc supported catalysts of the instant invention is smaller than the particle size produced using the silica supported catalyst component.

TABLE 1

| Example | Talc Average Mean Particle Size $(\mu m)^a$ | Polymer Type | PPM Talc$^b$ | Cat. Activity (g/g.cat) | MI (g/10 min)$^c$ | Comonomer Density $(g/cm^3)^d$ | Med. Particle Size $(\mu)^e$ | 90% Less Than $(\mu)^f$ |
|---|---|---|---|---|---|---|---|---|
| 1 | 2 | HDPE | 1933 | 517 | 0.55 | — | 112 | 204 |
| 2 | 6 | HDPE | 1834 | 545 | 1.50 | — | 185 | 279 |
| 3 | 9 | HDPE | 1954 | 512 | 1.05 | — | 181 | 243 |
| 4 | 2 | LLDPE | 1636 | 611 | 1.47 | Hexene 0.9344 | 126 | 263 |
| 5 | 6 | LLDPE | 2060 | 485 | 2.80 | Hexene 0.9319 | 169 | 226 |
| 6 | 9 | LLDPE | 1944 | 514 | 0.52 | Hexene 0.9317 | 145 | 220 |
| 7 | 2.3 | LLDPE | 3034 | 330 | 0.22 | Hexene 0.9461 | 46 | 104 |
| CE1 | (50)$^g$ | HDPE | 0 | 1100 | — | — | 344 | 466 |

$^a$Determined by standard BET measurements.
$^b$Determined by mass balance.
$^c$Determined by standard test procedure ASTM 1238.
$^d$Determined by standard test procedure D-2839.
$^e$Determined by Malvern Particle Sizer Seried 2600.
$^f$Determined by Malvern Particle Sizer Series 2600.
$^g$948 silica particle size.

EXAMPLES 8–14

In these examples, the metallocene $(Cp)_2ZrCl_2$ was supported on various talc supports having the particle sizes indicated in Table 2. Specifically the catalysts produced in these examples were prepared in accordance with the catalyst preparation procedure outlined in Examples 1–7 except that 2.0 g of the appropriate talc, as indicated in Table 2, was used. Then, 0.134 g of (Cp)$_2$ZrCl$_2$ in 30 ml of toluene was added in place of TiCl$_4$ and the slurry was stirred under nitrogen. The catalyst was dried as described in Examples 1–7.

The talc supported metallocene catalysts thus produced were then utilized to polymerize ethylene using the polymerization conditions set forth in Examples 1–7 or as described hereinbelow. Specifically, large scale polymerizations were carried out in a 3.8-liter autoclave using 2 liters of isobutane diluent, 4.5 ml of MMAO as the cocatalyst, 0.05 g of catalyst and a 5 psig pressure drop from a 300 ml vessel. The polymerization temperature employed in these large scale polymerizations was 80° C. The results of the polymerization runs are shown in Table 2.

TABLE 2

| Example | Talc Average Mean Particle Size (μm)[a] | Polymer Type | PPM Talc[b] | Cat. Activity (g/g · cat) | MI (g/10 min)[c] | Density (g/cm³)[d] |
|---|---|---|---|---|---|---|
| 8 | 2.3 | HDPE | 234 | 4272[e] | 15.8 | — |
| 9 | 9 | HDPE | 1000 | 1000[e] | 2.3 | — |
| 10 | 2 | HDPE | 1834 | 546[e] | 2.5 | — |
| 11 | 6 | HDPE | 1883 | 531[e] | 1.2 | — |
| 12 | 9 | HDPE | 2235 | 447[f] | 2.3 | — |
| 13 | 2.3 | LLDPE | 616 | 1623[f] | 8.2 | — |
| 14 | 2.3 | LLDPE | 501 | 1996[f] | 5.6 | 0.9455 |

[a]Determined by standard BET measurements.
[b]Determined by Malvern Particle Sizer Series 2600.
[c]Determined by standard test procedure ASTM 1238.
[d]Determined by standard test procedure ASTM D-2839.
[e]Run in 1 liter autoclave.
[f]Run in 3.8 liter autoclave.

TABLE 3

| Example | Talc Average Mean Particle Size (μm)[a] | Polymer Type | PPM Talc[b] | Cat. Activity (g/g · cat) | MI (g/10 min)[c] |
|---|---|---|---|---|---|
| 15 | 2.3 | LLDPE | 2701[d] | 370 | 0.47 |
| 16 | 2.3 | LLDPE | 3171[e] | 315 | 0.20 |
| 17 | 2.3 | LLDPE | 2444[d] | 409 | 1.49 |
| 18 | 2.3 | LLDPE | 2994[e] | 334 | 1.45 |

[a]Determined by standard BET measurements.
[b]Determined by mass balance.
[c]Determined by standard test procedure ASTM 1238.
[d]1 liter polymerization.
[e]20 liter polymerization.

EXAMPLES 15–18

In these examples mixed Ziegler/metallocene catalysts supported on talc were prepared and were used to polymerize ethylene. Specifically, the catalysts were prepared as follows. To 12.0 g of ABT-2500 talc dried as described in Examples 1–7 was added 45 ml of heptane and the slurry was stirred for 5 minutes. To the slurry was added 0.40 ml of MAGALA 7.5 E and the mixture was stirred for 30 minutes. Thereafter, 0.025 ml of n-butanol was injected and the slurry was stirred for another 30 minutes. Next, 0.18 ml of trichlorosilane was injected and the mixture was stirred for another 30 minutes. The contents of the flask were then heated to 50° C.–60° C. under a purge of nitrogen to completely dry the contents.

After drying, 14 ml of toluene and 0.035 of titanium tetrachloride were added to the reaction flask and the contents of the flask were stirred at room temperature under nitrogen for 30 minutes. Finally, 0.065 g of Cp$_2$ZrCl$_2$ was added and the mixture was stirred for another 30 minutes. The reaction mixture was thereupon subjected to drying using the conditions set forth in Examples 1–7.

The thus formed mixed Ziegler/metallocene catalysts were employed in the polymerization of ethylene using MMAO as the cocatalyst and the polymerization conditions described in Examples 1–7 or as follows. For large scale polymerizations, which were conducted at 80° C., a 20-liter autoclave, 200 ml of hexene, 4 liters of isobutane diluent, 1 mole of hydrogen, 20 ml of MMAO and 5–6 g of catalyst were used. The polymerization results for these examples are shown in Table 3.

EXAMPLE 19

Crystallization Study

In this example half crystallization times, $t_{1/2}$, of various polymers were compared. Samples A and B were products of the invention prepared using the polymers of Example 5 and Example 6, respectively. Sample C was prepared using the polymer of Comparative Example 1 and Sample D was obtained using a commercially available polyethylene resin modified by the post reactor addition of 2000 ppm talc. All samples used for the crystallization study were processed at 150° C. for 5 minutes using a Haake [trademark] mixer operating at 60 rpm and contained 1000 ppm Irganox [trademark] 1076.

The $t_{1/2}$ crystallization time is a measurement of the crystallization kinetics of the polymer. Lower $t_{1/2}$ times indicate more rapid crystallization at a given crystallization temperature. The $t_{1/2}$ values reported in Table 4 were determined using an oscillatory shear-induced crystallization study. More specifically, this study was carried out using the parallel plate geometer on a Rheometries Mechanical Spectrometer, Model No. 605.

The experiments were initiated at a temperature of 160° C. which is well above the melting point of the resins employed and an oscillatory shear having a preset frequency of 5 rad/sec and 10% strain. After approximately 3 minutes, the temperature was lowered to 124.5° C. The beginning of crystallization of the polymers during oscillatory shear flow was detected by a rise in the complex viscosity η* or elastic modules G'.

The results of this kinetic study is shown in Table 4. These tabulated results show that the crystallization rates of samples prepared using the talc supported catalysts of the instant invention (Samples A and B) were faster than those using a conventional silica supported catalyst (Sample C) or a sample that was prepared by the post addition of talc (Sample D).

TABLE 4

| Sample* | Talc Level (PPM)[a] | MI (g/10 min)[b] | Density (g/cm$^3$)[c] | $t_{1/2}$ (sec) |
|---|---|---|---|---|
| A | 2060 | 2.8 | 0.9281 | 770 |
| B | 1944 | 0.5 | 0.9300 | 920 |
| C | 0 | 1.0 | 0.9293 | >3000 |
| D | 2000 | 1.0 | 0.9298 | 1920 |

*Each sample contained 1000 ppm of the antioxidant Irganox 1076.
[a]Determined by mass balance.
[b]Determined by standard test procedure ASTM 1238.
[c]Determined by standard test procedure ASTM D-2839.

EXAMPLE 20

Preparation of Polypropylene Polymerization Catalyst

Ten (10) grams of talc were dried as described in Examples 1–7. To the dried talc was added 10 ml of heptane and 9 ml of 0.71 molar methylpentoxymagnesium chloride and the reactor contents were heated to 60° C. for 30 minutes under a nitrogen purge. Thereafter, the reactor was heated to 80° C. for 30 minutes and then to 100° C. to drive of the heptane. The resulted white powder was thereafter cooled to room temperature under nitrogen and 1.1 ml of silicon tetrachloride was injected along with 20 ml of heptane into the reactor. The mixture was stirred for 30 minutes at room temperature, then heated to 60° C. for 30 minutes.

The slurry was then cooled to room temperature and the resultant solid was washed 3 times with 70 ml of heptane each time by siphoning. The resulting slurry was then treated with 1.25 ml of titanium cresylate diluted 50% with heptane. The titanium cresylate was allowed to react for 5 minutes at room temperature and then 5 ml of titanium tetrachloride was introduced. This mixture was stirred for one hour at 90° C. and then cooled and washed 8 times with 90 ml of heptane each time. The catalyst was dried to a constant weight under nitrogen.
Polymerization of Propylene A 1-liter autoclave was charge with 1.0 ml of 25% triethylaluminum, 0.1 ml of 1 molar diisobutyldimethoxysilane, the above prepared catalyst, and hydrogen which was administered by a 25 psig pressure drop from a 150 ml vessel. Then, 250 g of propylene were introduced and the reactor was heated to 80° C. for 1 hour.

For larger scale polymerizations, a 3.8-liter reactor was used and the amounts of triethylaluminum, diisobutyldimethoxysilane, catalyst and hydrogen were increased proportionally. The polymerization data is reported in Table 5.

COMPARATIVE EXAMPLE 2

Five (5.0) grams of 948-HMDS treated silica was heated to 100° C. for one hour under nitrogen and cooled. To this silica was added 18 ml of 0.71 molar methylpentoxymagnesium chloride and the reactor was heated to 60° C. for 30 minutes under nitrogen, then heated to 80° C. for 30 minutes and then heated to 100° C. to drive of the heptane. The resultant white powder was cooled to room temperature under nitrogen and then 2.2 ml of silicon tetrachloride was added to the powder along with 15 ml of heptane. This mixture was stirred at room temperature for 30 minutes then heated to 60° C. for 30 minutes. The slurry was then cooled to room temperature and washed 3 times with 20 ml of heptane. The resultant slurry was treated with 2.5 ml of titanium tetracresylate solution diluted 50% with heptane or 0.5 mmol/g silica.

The titanium tetracresylate was allowed to react with the slurry for 5 minutes at room temperature and then 10 ml (18 mmol/g silica) of titanium tetrachloride was introduced. The mixture was stirred for one hour at 90° C. and then washed 8 times with 90 cc of heptane each time. The catalyst was dried to a constant weight under nitrogen and used in the polymerization of propylene. The polymerization results are tabulated in Table 5.

TABLE 5

| Example | Talc Medium Particle Size | Polymer Type | ppm Talc | Catalyst Activity g/g Cat | MI[a] g/10 min |
|---|---|---|---|---|---|
| 20 | 0.9 | pp | 933 | 1072[b] | 3.7 |
| CE2 | (50 M)≠ | pp | 0 | 9288[b] | 2.6 |

≠948 silica
[a]Determined by ASTM 1238.
[b]3.8 liter polymerization.

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A supported polymerization catalyst component obtained by the steps of:
(a) contacting talc with an organomagnesium compound or complex in an amount such that the weight ratio of talc to magnesium is from about 1000:1 to about 5:1, wherein said organomagnesium compound or complex has one of the following formulas:

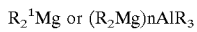

$R_2^1Mg$ or $(R_2Mg)nAlR_3$ where R and $R^1$ are each independently alkyl or alkoxide containing from about 1 to about 12 carbon atoms, cyclopentadienyl or aryl, and n is 0.5–10;
(b) contacting the product produced in step (a) with an alcohol; and
(c) contacting the product produced in step (b) with at least one transition metal-containing compound and/or a metallocene effective in ethylene polymerization reactions.

2. The catalyst component of claim 1 wherein the talc is pretreated by heating said talc to a temperature of at least about 150° C.

3. The catalyst component of claim 1 wherein the transition metal compound(s) has the structural formula(s) $M'(OR^3)_x(O)_y(X^4)_z$ and/or $M(OR^2)_qX_p^3$ wherein M' is a metal of Group VB of the Periodic Table of Elements, $X^4$ is a halogen; $R^3$ is a hydrocarbyl having from about 1 to about 18 carbon atoms; x is 0 or an integer from 1 to 5; y is 0 or an integer from 1 to 3; z is 5−x−2y; M is a metal of Group IVB; $R^2$ is an aryl, alkyl, aralkyl, cycloalkyl or alkylsilyl; $X^3$ is a halogen; and p and q range from 0 to 4 with the proviso that sum of p and q is 3 or 4.

4. The catalyst component of claim 3, wherein the transition metal compound has the formula $M(OR^2)_qX_p^3$ wherein M is titanium; p is an integer from 2 to 4; q is 0 or an integer from 1 to 2; and $X^3$ is chloride.

5. The catalyst component of claim 4 wherein p is 4 and q is 0.

6. The catalyst component of claim 1 wherein the metallocene has one of the following formulas $(Cp)_aM''R^{b4}X_c^5$ wherein Cp is cyclopentadienyl, indenyl or fluorenyl ring; M'' is a Group IVB or VB transition metal; $R^4$ is a hydride or a hydrocarbyl group having from about 1 to about 20 carbon atoms; $X^5$ is a halogen atom; a is an integer of 1 to 3; b is 0 or an integer of 1 to 3; c is 0 or an integer of 1 to 3 with the proviso that the sum of a, b and c is equal to the oxidation state of M''

$(C_5R_k^5)_g R_f^6(C_5R_k^5)M''Q_{3-g}$ or $R_f^6(C_5R_k^5)_2M''Q'$ wherein $(C_5R_k^5)$ is a substituted or unsubstituted cyclopentadienyl, indenyl or fluorenyl; each $R^5$ is the same or different and is hydrogen or alkyl, alkenyl, aryl, alkaryl, or aralkyl containing from about 1 to about 20 carbon atoms or are joined together to form a $C_4$–$C_6$ ring; $R^6$ is a $C_1$–$C_4$ alkylene radical, a dialkyl germanium, a dialkyl silicon, an alkyl phosphine or an amine radical bridging two $(C_5R_k^5)$ rings; Q is the same or different and is aryl, alkyl, alkenyl, alkaryl, or aralkyl having from 1–20 carbon atoms, a hydrocarboxy radical having from 1–20 carbon atoms or halogen; Q' is an alkylidiene radical having from 1 to about 20 carbon atoms; f is 0 or 1; g is 0, 1 or 2; with the proviso that f is 0 when g is 0, k is 4 when f is 1, and k is 5 when f is 0, and M'' has the meaning given above.

7. The catalyst component of claim 6 wherein the metallocene is $Zr(Cp)_2Cl_2$.

8. The catalyst component of claim 1 wherein said alcohol is n-butanol.

9. The catalyst component of claim 1 wherein the weight ratio of talc to magnesium in the organomagnesium component is about 500:1.

10. An alpha-olefin catalyst system comprising the catalyst component of claim 1 and at least one aluminum-containing cocatalyst compound.

11. The catalyst system of claim 10 wherein the aluminum-containing cocatalyst is selected from the group consisting of a trialkyl aluminum, an alkyl aluminum halide, an aluminoxane and mixtures thereof.

12. The catalyst system of claim 11 wherein the aluminum-containing cocatalyst is an aluminoxane.

13. The catalyst system of claim 10 wherein the aluminoxane is methylaluminoxane.

14. A process for polymerizing ethylene or copolymerizing ethylene with another alpha-olefin into polymers having a narrow particle size distribution and having enhanced crystallization rates comprising (a) polymerizing ethylene alone or with another alpha-olefin under ethylene polymerization conditions in the presence of a supported polymerization catalyst component and an aluminum-containing cocatalyst component wherein said supported polymerization catalyst component is obtained by the steps of:

(a) contacting talc with an organomagnesium compound or complex in an amount such that the weight ratio of talc to magnesium is from about 1000:1 to about 5:1, wherein said organomagnesium compound or complex has one of the following formulas:

$R_2^1Mg$ or $(R_2Mg) \cdot nAlR_3$ where R and $R^1$ are each independently alkyl or alkoxide containing from about 1 to about 12 carbon atoms, cyclopentadienyl or aryl, and n is 0.5–10;

(b) contacting the product produced in step (a) with an alcohol; and (c) contacting the product produced in step (b) with at least one transition metal-containing compound and/or a metallocene effective in said ethylene polymerization reaction.

15. The process of claim 14 wherein the aluminum-containing cocatalyst is selected from the group consisting of a trialkyl aluminum, an alkyl aluminum halide, an aluminoxane and mixtures thereof.

16. The process of claim 15 wherein the aluminum-containing cocatalyst is an aluminoxane.

17. The process of claim 16 wherein the aluminoxane is methylaluminoxane.

18. The process of claim 14 wherein the polymerization of ethylene is conducted at a temperature from about 60° C. to about 100° C.

19. The process of claim 14 wherein the weight ratio of talc to magnesium in the organomagnesium component is about 500:1.

20. A supported polymerization catalyst component obtained by the steps of:

(a) contacting talc with an organomagnesium compound or complex in an amount such that the weight ratio of talc to magnesium is from about 1000:1 to about 5:1, wherein said organomagnesium compound or complex has one of the following formulas:

$R_2^1Mg$ or $(R_2Mg) \cdot nAlR_3$ where R and $R^1$ are each independently alkyl or alkoxide containing from 1 to about 12 carbon atoms, cyclopentadienyl or aryl, and n is 0.5–10;

(b) contacting the product produced in step (a) with an alcohol;

(c) drying the product produced by step (b) under conditions to provide a surface coverage of magnesium values of from 1 to about 3 layers; and (d) contacting the product produced in step (c) with at least one transition metal-containing compound and/or a metallocene effective in ethylene polymerization reactions.

21. The supported polymerization component of claim 20 wherein said drying is conducted under a nitrogen atmosphere.

22. A process for polymerizing ethylene or copolymerizing ethylene with another alpha-olefin, said polymer having a narrow particle size distribution and enhanced crystallization rates comprising (a) homopolymerizing ethylene or copolymerizing ethylene with another alpha-olefin, under ethylene polymerization conditions, in the presence of a supported polymerization catalyst component and an aluminum-containing cocatalyst component, wherein said supported polymerization catalyst component is obtained by the steps of:

(a) contacting talc with an organomagnesium compound or complex in an amount such that the weight ratio of talc to magnesium is from about 1000:1 to about 5:1, wherein said organomagnesium compound or complex has one of the following formulas:

$R_2^1Mg$ or $(R_2Mg) \cdot nAlR_3$ where R and $R^1$ are each independently alkyl or alkoxide containing from about 1 to about 12 carbon atoms, cyclopentadienyl or aryl, and n is 0.5–10;

(b) contacting the product produced in step (a) with an alcohol;

(c) drying the product produced by step (b) under conditions to provide a surface coverage of magnesium values of from 1 to about 3 layers; and (d) contacting the product produced in step (c) with at least one transition metal-containing compound and/or a metallocene effective in said ethylene polymerization reaction.

* * * * *